(12) United States Patent
Webb

(10) Patent No.: US 10,132,570 B2
(45) Date of Patent: Nov. 20, 2018

(54) HEAT EXCHANGER WITH MULTIPLE FLOW TUBES FOR FLUID CIRCULATION

(71) Applicant: Frederick Mark Webb, Petrie (AU)

(72) Inventor: Frederick Mark Webb, Petrie (AU)

(*) Notice: Subject to any disclaimer, the term of this patent is extended or adjusted under 35 U.S.C. 154(b) by 0 days.

(21) Appl. No.: 15/393,519

(22) Filed: Dec. 29, 2016

(65) Prior Publication Data
US 2017/0108279 A1    Apr. 20, 2017

Related U.S. Application Data

(63) Continuation of application No. 13/344,120, filed on Jan. 5, 2012, now abandoned, which is a
(Continued)

(30) Foreign Application Priority Data

Jul. 6, 2009  (AU) ................................ 2009903157
Jul. 19, 2011 (AU) ................................ 2011902904

(51) Int. Cl.
| | |
|---|---|
| *B23P 15/26* | (2006.01) |
| *F28D 1/047* | (2006.01) |
| *F28F 1/40* | (2006.01) |
| *F28D 1/053* | (2006.01) |
| *F28D 7/10* | (2006.01) |

(Continued)

(52) U.S. Cl.
CPC .......... *F28D 1/0473* (2013.01); *B23P 15/26* (2013.01); *F28D 1/0477* (2013.01); *F28D 1/05316* (2013.01); *F28D 7/106* (2013.01); *F28F 1/022* (2013.01); *F28F 1/26* (2013.01); *F28F 1/36* (2013.01); *F28F 1/40* (2013.01); *F28F 13/06* (2013.01); *F28F 13/12* (2013.01);
(Continued)

(58) Field of Classification Search
CPC . F28D 1/0473; F28F 1/022; F28F 1/12; F28F 1/32; F28F 1/36; F28F 13/12; F28F 9/02; F28F 2260/02; B21D 53/027; B21D 53/02; B21D 53/06; B21D 53/08; B23P 15/26; Y10T 29/4935; Y10T 29/49377; Y10T 29/49378; Y10T 29/49382; Y10T 29/49391; Y10T 29/49385
See application file for complete search history.

(56) References Cited

U.S. PATENT DOCUMENTS

| | | |
|---|---|---|
| 2,158,324 A | 5/1939 | Furry |
| 2,471,317 A | 5/1949 | Fausek et al. |

(Continued)

FOREIGN PATENT DOCUMENTS

| | | |
|---|---|---|
| DE | 19721657 A1 | 12/1998 |
| GB | 813565 | 5/1959 |

(Continued)

OTHER PUBLICATIONS

European Search Report dated Nov. 28, 2012; EP12275107.
(Continued)

*Primary Examiner* — Sarang Afzali
(74) *Attorney, Agent, or Firm* — Ladas & Parry LLP

(57) ABSTRACT

A heat exchanger having a primary flow path arranged to contain a first heat exchanging medium. A secondary flow path arranged to contain a secondary heat exchanging medium, wherein the primary flow path surrounds the secondary flow path for exchanging heat between the two paths.

5 Claims, 16 Drawing Sheets

Related U.S. Application Data continuation-in-part of application No. PCT/AU2010/000866, filed on Jul. 6, 2010.

(51) Int. Cl.
  *F28F 1/02*  (2006.01)
  *F28F 1/26*  (2006.01)
  *F28F 1/36*  (2006.01)
  *F28F 13/06*  (2006.01)
  *F28F 13/12*  (2006.01)

(52) U.S. Cl.
  CPC ..... *F28F 2260/02* (2013.01); *Y10T 29/49382* (2015.01); *Y10T 29/49391* (2015.01)

(56) References Cited

U.S. PATENT DOCUMENTS

| | | | |
|---|---|---|---|
| 2,993,682 A | 7/1961 | Huet | |
| 3,151,672 A | 10/1964 | Edmund | |
| 3,197,975 A | 8/1965 | Boling | |
| 3,662,582 A | 5/1972 | French | |
| 4,326,582 A | 4/1982 | Rosman et al. | |
| 4,351,389 A | 9/1982 | Guarnaschelli | |
| 4,589,844 A | 5/1986 | Loukas et al. | |
| 2004/0261986 A1* | 12/2004 | Insalaco | F28F 1/022 165/181 |
| 2005/0236145 A1 | 10/2005 | Arai et al. | |
| 2005/0269069 A1* | 12/2005 | Hancock | F28D 1/0473 165/179 |
| 2012/0160465 A1 | 6/2012 | Webb | |

FOREIGN PATENT DOCUMENTS

| | | |
|---|---|---|
| GB | 872666 | 7/1961 |
| JP | 2003-139478 A | 5/2003 |
| NZ | 210394 A | 5/1987 |
| NZ | 207540 A | 11/1987 |
| SU | 1613835 A2 | 12/1990 |
| SU | 1746196 A1 | 7/1992 |
| WO | 2004/068054 A1 | 8/2004 |
| WO | 2011/003140 A1 | 1/2011 |

OTHER PUBLICATIONS

International Search Report dated Sep. 10, 2010; PCT/AU2010/000866.
Australian Examination Report No. 1, Appln. No. 2012200524; dated Sep. 21, 2012.
New Zealand Examination Report dated Feb. 13, 2012; Appln. 598007.
New Zealand Examination Report; dated Feb. 13, 2012; Appln. 598010.
USPTO NFOA dated Mar. 28, 2014 in connection with U.S. Appl. No. 13/344,120.
USPTO FOA dated Sep. 5, 2014 in connection with U.S. Appl. No. 13/344,120.
USPTO NFOA dated Jun. 5, 2015 in connection with U.S. Appl. No. 13/344,120.
USPTO FOA dated Dec. 3, 2015 in connection with U.S. Appl. No. 13/344,120.
USPTO NFOA dated Jul. 1, 2016 in connection with U.S. Appl. No. 13/344,120.

* cited by examiner

| Air Temp Over coil | | Pressure Readings PSIG | | Temperature Readings °C | | | | | | | | | | | | | | | | | | |
|---|---|---|---|---|---|---|---|---|---|---|---|---|---|---|---|---|---|---|---|---|---|---|
| | | | | \multicolumn{20}{l}{Results prior to modification (Figure 6)} |
| In | Out | Discharge Pressure | Suction Pressure | A | B | C | D | E | F | G | H | I | J | K | L | M | N | O | P | Q | R | S | T | U |
| 24 | 31 | 150 | 22 | 65.3 | 55.8 | 48.5 | 41.3 | 41 | 41 | 41 | 41 | 41 | 41 | 41 | 41 | 41 | 41 | 41 | 41 | 41 | 37.8 | 33.2 | 29.7 | 29.5 |
| \multicolumn{25}{l}{Results using half condenser Figure 7 (low ambient temperature)} |
| 12.5 | 16.5 | 130 | 14 | | | | | | | | | | 59.5 | 43.2 | 38.9 | 4.1 | 3.8 | | | | 20.6 | 17.9 | | 15.6 |
| \multicolumn{25}{l}{Results after modification using half condenser, Figure 7 (low ambient temperature)} |
| 11.3 | 13.9 | 180 | 14 | 54.1 | 43.5 | 39.3 | 33.4 | 24.1 | 17.9 | 14.6 | 13.3 | 13.2 | | | | | | | | | | | |
| 11.6 | 15.3 | 160 | 15 | 63.1 | 44.1 | 39.8 | 33.7 | 25.1 | 18.5 | 15.1 | 13.7 | 13.5 | | | | | | | | | | | |

For the sake of expediency, only half of the condenser was modified and to compensate for loss of condensing capacity, the Tests on the halved condenser were carried out in a low ambient temperature environment.

NOTE:- 3 passes were destroyed on modification on the left hand side of the coil, although the remaining passes were sufficient to show a positive result.

Figure 8

DETAIL A

HEAT EXCHANGER WITH MULTIPLE FLOW TUBES FOR FLUID CIRCULATION

TECHNICAL FIELD

The present invention relates generally to heat exchangers methods for forming the same. More specifically, but by no means exclusively, the invention relates to tubing configurations for improving heat transfer characteristics of a heat exchanger.

BACKGROUND OF THE INVENTION

Heat exchangers can be found in many devices where cooling or heating of fluids, including liquids and gases, is required. The basic principle of any heat exchanger is to provide efficient transfer of heat from one heat exchanging material (e.g. gas, fluid, etc.) to another, without any direct contact between the two. Heat exchangers are commonly found, for example, in refrigeration units, power plants, air conditioning systems, among others.

One well-known type of heat exchanger is the Fin and Tube exchanger commonly found, for example, in refrigeration condensers. Fin and Tube exchangers employ a plurality of inter-connected tubes positioned within, and thermally-coupled to, a metal structure which is exposed to a flow of air. Often, the metal structure takes the form of a plurality of metal "fins" which run perpendicular to the inter-connected tubes and which serve to increase the effective surface area of the heat exchanger.

Fluid circulating through the tubes gives off its heat by convection to a flow of air passing through the fins. For certain applications, the flow of air may be forced through the tins by way of a fan. Clearly, the larger the heat exchanger, the larger the fan required to move the air for suitably affecting suitable heat transfer. As may be appreciated by those skilled in the art, despite being well known and used, heat exchangers employing fluid carrying pipes, such as those previously described, have a number of drawbacks. For example, in order to provide sufficient heat transfer for many processes, the interconnected pipes need to be many meters in length leading to the exchangers being relatively large in size when compared to the refrigeration unit (or an equivalent water cooling tower of the same heat load capacity). This in turn not only limits the range of sites that the device can be installed in, but also leads to appreciable manufacturing and operational costs.

SUMMARY OF THE INVENTION

According to a first aspect of the present invention there is provided a heat exchanger comprising: a primary flow path arranged to contain a first heat exchanging medium; and a secondary flow path arranged to contain a secondary heat exchanging medium, wherein the primary flow path surrounds the secondary flow path for exchanging heat between the two mediums.

In an embodiment the primary flow path is helical.

In an embodiment the primary flow path is partitioned.

In an embodiment the primary flow path is surrounded by one or more heat exchanging fins.

In an embodiment the exchanger further comprises a length of tube and wherein the secondary medium is carried within a body of the tube and the first medium is carried within a circumferential outer wall of the body.

In an embodiment the tube has a circular cross section.

In an embodiment the exchanger further comprises an inlet manifold coupled to a first end of the tube and having a fluid path flow in fluid connection with the primary flow path of the tube for delivery of the first medium.

In an embodiment the exchanger further comprises an outlet manifold coupled to a second end of the tube and having a fluid path flow in fluid connection with the primary flow path for expelling the primary medium.

In an embodiment the exchanger further comprises a plurality of tubes and wherein the inlet and outlet manifold each comprise a manifold tube having openings defined along their length for receiving corresponding ends of the respective exchanger tubes.

In an embodiment an inner surface of the circumferential wall for each tube extends through the manifold tube and meets with a second opening in the manifold tube for receiving/expelling the secondary medium.

In accordance with a second aspect there is provided a method of constructing a heat exchanger comprising forming a primary path flow arranged to contain a first heat exchanging medium, so as to surround a secondary path flow arranged to carry a secondary heat exchanging medium.

In an embodiment the primary flow path is a helical flow path.

In an embodiment the method further comprises forming the helical flow path by winding or extruding a length of a primary tube having a generally elongate cross section such that the length extends along a helical path.

In an embodiment the method further comprises winding/extruding the length of tube such that a closed outer circumferential wall is formed so as to define the secondary flow path.

In an embodiment the method further comprises locating an inner tube arranged to carry the secondary flow path within the wound length of primary tube.

In an embodiment the method further comprises coupling a first end of the primary tube to an opening in an inlet tube arranged to deliver the first medium such that the primary flow path is in fluid communication with the inside of the inlet tube.

In an embodiment the method further comprises coupling a second end of the primary tube to an opening in an outlet tube arranged to expel the first medium such that the primary flow path is in fluid communication with the inside of the outlet tube.

In an embodiment the method further comprises passing the secondary flow path through a second opening in the respective inlet/outlet tube for delivering/expelling the secondary medium. In accordance with a further aspect there is provided a heat exchanger comprising one or more tubes arranged to carry a flow of a first heat exchanging medium, the first medium arranged to exchange heat with a second heat exchanging medium in thermal contact with the one or more tubes; and a flow direction control insert located within each tube and operable to control flow of the first medium.

In an embodiment the flow direction control inserts is operable to vary the effective path length of the conduit.

It an embodiment the conduits are in the form of tubes of cylindrical cross section, although it will be understood that other forms of tube or conduit are equally applicable and are not limited to being of cylindrical cross section (e.g. square conduits, hexagonal conduits and the like are envisaged).

In an embodiment, the flow direction control insert comprises an elongate body having an outer surface which controls the flow. In an embodiment the outer surface is operable to direct the flow within the tube to increase the effective length of the tube for the purposes of heat exchange.

In an embodiment, the elongate body extends the length of each tube. In an embodiment, the elongate body is in the form of a helical screw. The outer circumference of the helical screw may, for example, sealingly contact an inner surface of the tube to create a helical flow channel. In an embodiment, the pitch of the helical screw is varied to adjust the effective length of the tube. Alternatively, the diameter of the tube along with the diameter of the helical screw body may be varied to adjust the effective length.

In an embodiment, the two heat exchanging mediums may be selected from air, steam, water, refrigerant, oil, beverage, or any combination thereof.

In an embodiment, the heat exchanger is one of a condenser, evaporator, cooling tower, radiator, Shell & Tube and Tube in Tube heat exchanger configuration. In an embodiment, the insert is formed from a plastic, polymer, elastomer, or rubber material. Alternatively, the insert may be formed from a corrosion resilient metal or alloy, or any other suitable material.

In an embodiment, each insert comprises one or more sections. The one or more sections may direct the flow in a different manner to other sections. For example, the temperature difference through the first few passes (i.e. tube lengths) may be substantially greater than for the subsequent passes, allowing rapid heat transfer and thus not requiring any form of insert to be implemented (although in an embodiment, an insert may well be provided depending only on the desired implementation). For the remaining passes, a helical insert as previously described may be incorporated within the tubing to account for the loss in heat transfer (i.e. this will effectively reduce the speed of the circulating fluid to allow more time for the circulating fluid to contact the inner wall of the tubing). The flow direction control insert may be implemented at a section of the tubing where the temperature difference is not much different from the second medium, which allows more time for heat transfer.

In an embodiment the tube comprises an outer surface having one or more fins located thereon which are in thermal contact with the second heat exchanging medium. In an embodiment the one or more fins are helical outer fins which wrap around the outer surface of the body. In an embodiment a pitch of the helical insert corresponds with a pitch of the helical fins. In an embodiment a plurality of helical fins are located on the outer surface having progressively staged start locations.

In an embodiment the tube and at least one of the helical outer fins and helical insert are extruded from a single blank. In an embodiment the tube and helical insert and/or fin are formed from a single aluminium extrusion. A heat exchanger formed from such a one piece extrusion may significantly reduce construction time and cost.

In accordance with a further aspect of the present invention there is provided a flow direction control insert arranged to be located inside a heat exchanger comprising a tube arranged to carry a flow of a first heat exchanging medium arranged to exchange heat with a second heat exchanging medium which is in thermal contact with the tubes, whereby the flow direction control insert is operable to control flow of the first medium within the tube to thereby vary the effective path length of the tube and in turn adjust the heat transfer characteristics of the heat exchanger.

In accordance with another aspect of the present invention there is provided a method for varying a heat transfer characteristic of a heat exchanger comprising a tube arranged to carry a flow of a first heat exchanging medium arranged to exchange heat with a second heat exchanging medium which is in thermal contact with the tube, the method comprising the steps of: locating a flow direction control insert within the tube, the flow direction control insert having an outer surface which is arranged to control flow of the first medium within the tube to thereby vary the effective path length of the tube and in turn vary the heat transfer characteristic.

In accordance with yet another aspect of the present invention there is provided a method of forming a heat exchanger comprising extruding a length of heat transmissive material through a die so as to form a tube having one or more helical fins which extend around an outer surface of the tube, the tube arranged to carry a flow of a first heat exchanging medium, the first medium arranged to exchange heat with a second heat exchanging medium in thermal contact with the one or more helical fins.

In an embodiment the method further comprises extruding the length of heat transmissive material to form a flow direction control device within the tube, the flow direction control device having an outer surface which is arranged to control flow of the first medium within the tube to thereby vary the effective path length of the tube and in turn vary the heat transfer characteristic.

In accordance with a still further aspect of the present invention there is provided a method of forming a heat exchanger comprising extruding a length of heat transmissive material through a die so as to form a tube having an inner surface in which is defined a flow direction control device, the device arranged to control the flow of a first heat exchanging medium arranged to be passed through the tube and which medium is arranged to exchange heat with a second heat exchanging medium in thermal contact with an outer surface of the tube. In an embodiment the flow direction control device comprises a helical screw as described in accordance with the first aspect.

In an embodiment the heat transmissive material is aluminium. In accordance with a sixth aspect of the present invention, there is provided a method of improving a heat transfer characteristic of an existing heat exchanger comprising a tube arranged to carry a flow of a first heat exchanging medium arranged to exchange heat with a second heat exchanging medium which is in thermal contact with the tube, the method comprising the steps of: locating a flow direction control insert within the tube, the flow direction control insert having an outer surface which is arranged to control flow of the first medium within the tube to thereby increase the effective path length of the tube and in turn improve the heat transfer characteristics.

In an embodiment the method could be used to adapt existing exchangers.

In an embodiment, the flow direction control insert comprises an elongate body and has the characteristics as previously described with reference to a first and/or second aspect.

According to a further aspect of the present invention there is provided a tube for a heat exchanger, the tube arranged to carry a flow of a first heat exchanging medium, the first medium arranged to exchange neat with a second heat exchanging medium in thermal contact with the tube, and a flow direction control device located within the tube and operable to control flow of the first medium.

In an embodiment the flow direction control device is integrally formed with the tube. In an alternative embodiment the device is provided as a separate removably coupled insert.

In accordance with an eighth aspect of the present invention there is provided a method for varying a heat transfer characteristic of a heat exchanger comprising a tube arranged to carry a flow of a first heat exchanging medium arranged to exchange heat with a second heat exchanging medium which is in thermal contact with the tube, the method comprising controlling a direction of the flow of the first heat exchanging medium within the tube so that it flows a greater distance than the tube length.

It should be appreciated from the above description that according to at least certain aspects there may be provided an improved heat exchanger design including modified tube design, lower mass and overall dimensions, modified methods to assemble the exchanger (or retro-fit an existing heat exchanger) using flow direction control techniques that are operable to vary the effective length of the heat exchanger tubing. The advantages which should be apparent to those skilled in the art may include an increased heat transfer efficiency, lower manufacturing and running costs through reduced materials, reduced power consumption, simplified installation and the ability to cost effectively retrofit an existing exchanger for improving fluid transfer characteristics.

BRIEF DESCRIPTION OF DRAWINGS

Features and advantages of the present invention will become apparent from the following description of embodiments thereof, by way of example only, with reference to the accompanying drawings, in which:

FIG. 8 is a graph showing test results for the FIGS. 6 and 7 configurations;

FIGS. 20a-20c are combined with FIGS. 18-19.

DETAILED DESCRIPTION OF EMBODIMENTS

In the following description, for the purpose of illustration only, embodiments of the present invention are described in the context of a heat exchanger for a refrigerator, and more particularly to the tube configuration of the refrigerator's condensing unit. It will be appreciated, however, that embodiments may be implemented for any form of heat exchanger which employs one or more tubes utilised to transfer heat from one medium to another. For example, embodiments could be implemented for small scale applications (such as the refrigeration application described herein) right through to large scale industrial applications including, for example, radiator panels for cooling towers. It should also be appreciated that many of the referenced figures are not to scale, and only serve to conceptually illustrate the various heat exchanger components and interactions between those components for achieving improved heat transfer and condensation draining characteristics when compared to conventional exchanger designs.

Figure 1:
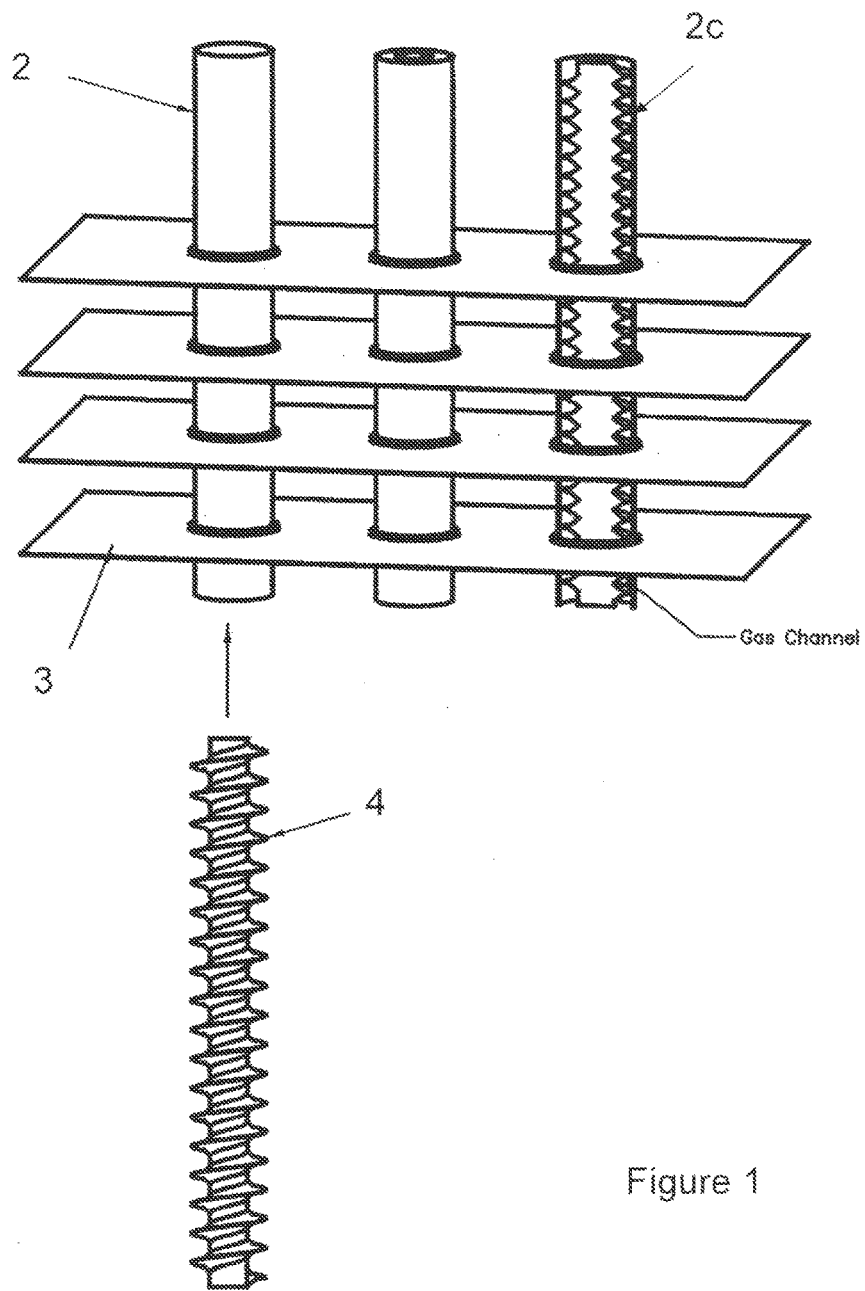
FIG. 1 is a schematic of a heat exchanger assembly illustrating installation of a flow direction control insert, in accordance with an embodiment of the present invention.

With reference to FIG. 1 there is shown a heat exchanger in accordance with a first embodiment of the present invention. As mentioned above, the heat exchanger is in the form of a fin and tube-type exchanger for a refrigeration condensing unit.

According to the first embodiment, the heat exchanger 1 comprises a plurality of tubes 2 which are arranged to carry a flow of a first heat exchanging medium in the form of a refrigerant (e.g. such as R134A-R410, R22, R404A refrigerant that are particularly suited for refrigeration applications).

The tubes 2 extend through, and are in thermal contact with, a plurality of stacked fins 3 which are in perpendicular alignment to the tubes 2. As persons skilled in the art will appreciate the configuration of the tubes 2 and fins 3, act to transfer heat from the refrigerant circulating through the pipes to a second medium to thereby cool the refrigerant. In the illustrated embodiment the second medium is air which absorbs the heat from the refrigerant thereby allowing it to cool, condense and turn into a liquid before being recycled to an expansion device and an evaporator unit of the refrigerator.

Figures 2A, 2B:
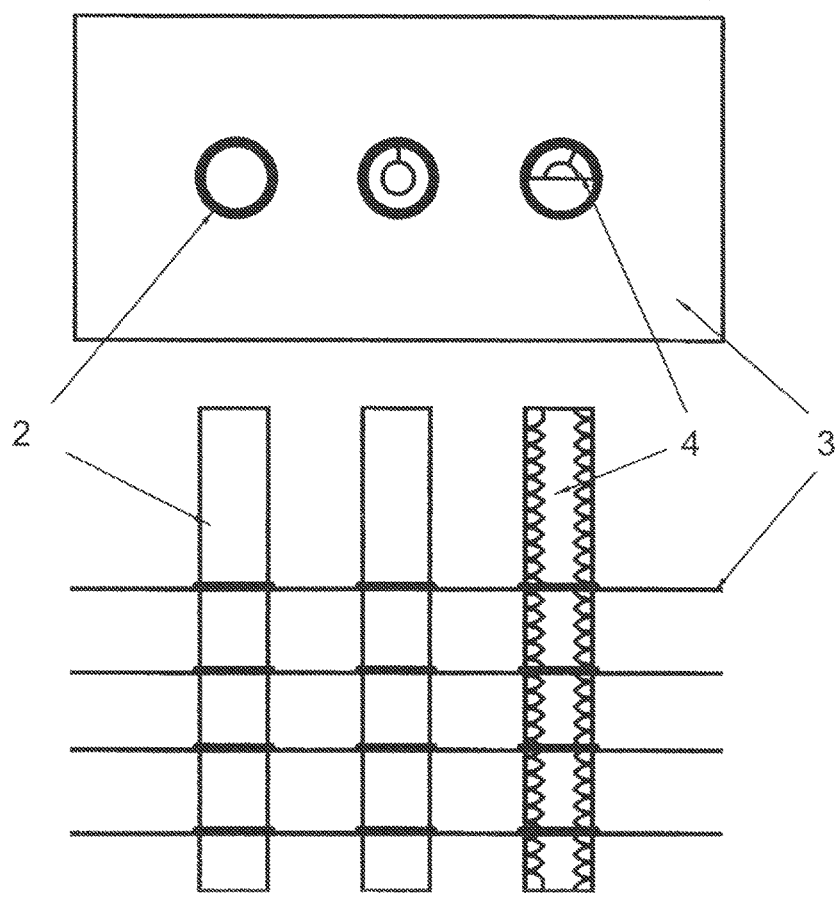
FIGS. 2a and 2b are sectional top and side elevation views, respectively, of a heat exchanger employing a flow direction control insert, in accordance with an embodiment of the present invention.
Figure 3:
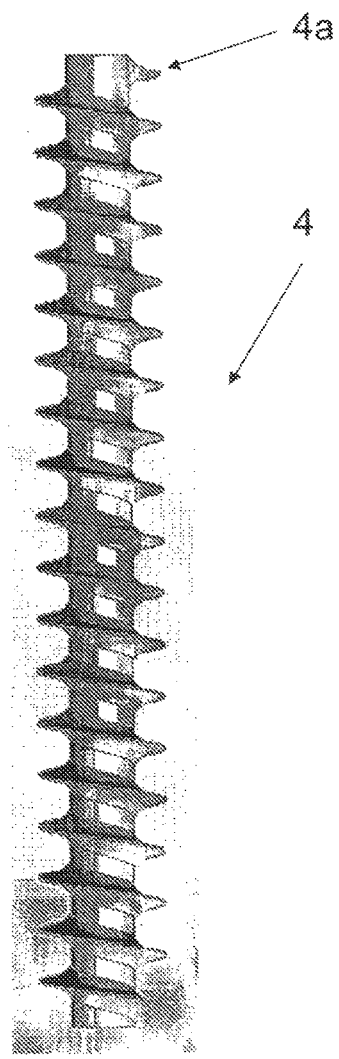
FIG. 3 is a schematic of a helical flow direction control insert, in accordance with an embodiment of the present invention.
Figure 4:
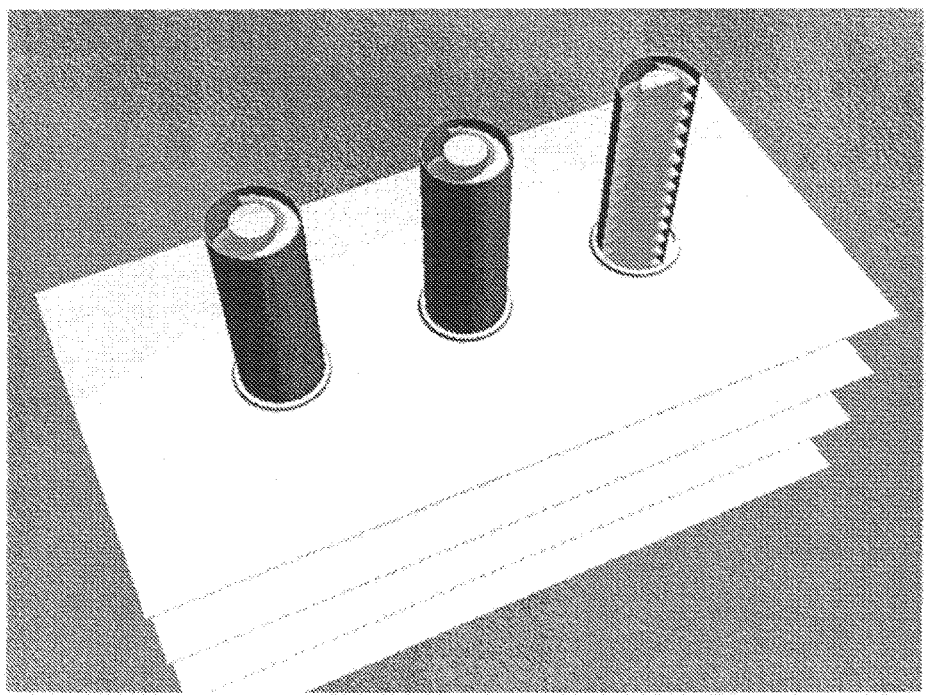
FIG. 4 is a perspective view showing hidden detail of the FIG. 1 heat exchanger embodiment.

At the bottom left hand section of FIG. 1 there is shown a flow direction control insert 4 which is arranged to be located within each tube (as shown in partial hidden detail in the right most tube 2c) and operable to control flow direction of the first medium through the tube to thereby vary the effective path length of the tube. With additional reference to elevation views shown in FIGS. 2a and 2b and 3, the flow direction control inserts are in the form of helical screws 4 that effectively extend the length of each tube (and in turn improve the heat transfer characteristics as will be described in subsequent paragraphs). In the illustrated example, the screws are made of a deformable rubber and are sized such that outer circumference of each helical rib 4a is in direct contact with an inner surface of the tube to thereby form a flowpath (denoted in the drawings as a "gas channel") that serves to increase the effective length of the tube 2. This is best shown in FIG. 2a. While in the illustrated example the ribs 4a of the helical screw 4 sealingly engage the tube's inner surface (i.e. an outer edge 5 of each rib 4a is arranged in an interference fit with an inner surface 6 of the tube), in other embodiments the ribs may not extend right the way thereto. According to such an alternative embodiment, the insert 4 may still serve to vary the effective path length, albeit not to the same extent as where they extend right the way. It will be understood that different helical screw configurations and dimensions will have an effect on the extent of the flow path variance. For example, different capacity units will require different size chambers to allow correct flow. Different capacities may be achieved by means of increasing pipe and helical screw diameter and increasing/decreasing the inner diameter (shank) of the helical screw. The helical screw pitch will also adjust the effective length of the flow path; the smaller the pitch of the screw, the longer the effective flow path of the chamber. Furthermore, it will be appreciated that the helical screw may not have a shank but instead be in the form of a spring made from flat rather than a round section.

A method of forming a heat exchanger panel in accordance with the first embodiment of the present invention will now be described with additional reference to the flow diagram 500 of FIG. 5.

Figure 5:
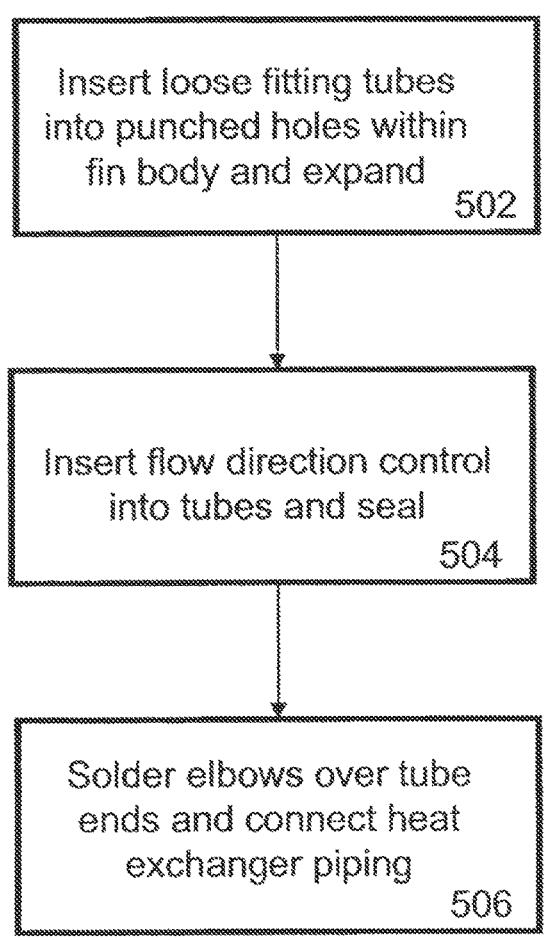
FIG. 5 is a process flow diagram showing method steps for varying heat transfer characteristics of a heat exchanger, in accordance with an embodiment of the present invention.

With reference to FIG. 5 (section A), a conventional fin and tube heat exchanger is manufactured from a plurality of fins with holes punched evenly, the quantity of which is commensurate with the heat load for the design of the condensing unit. Loose fitting tubes are then inserted through the punched holes and expanded so that the tube is a tight fit in the punched holes (step 502).

At step 504, a flow direction control insert in the form of a helical screw is inserted into one or more of the tubes, depending on the heat transfer characteristics required (in the illustrated embodiment it will be noted that all tubes have been used). Insertion may be achieved by utilising an insert formed of a product that will deform on insertion and reform once in place (e.g. elastomeric type material). An alternative method may be to insert a thin walled metal helical screw with a bore through the centre that will allow a (bullet) to be drawn through the tube expanding the screw to the inner surface of the tube. According to such an embodiment the ends of the tube would need to be sealed prior to soldering the elbows on described later). To retrofit an existing heat exchanger, the elbows on one end of the heat exchanger would need to be removed, the helical screw inserted and the elbows replaced.

Figure 6:
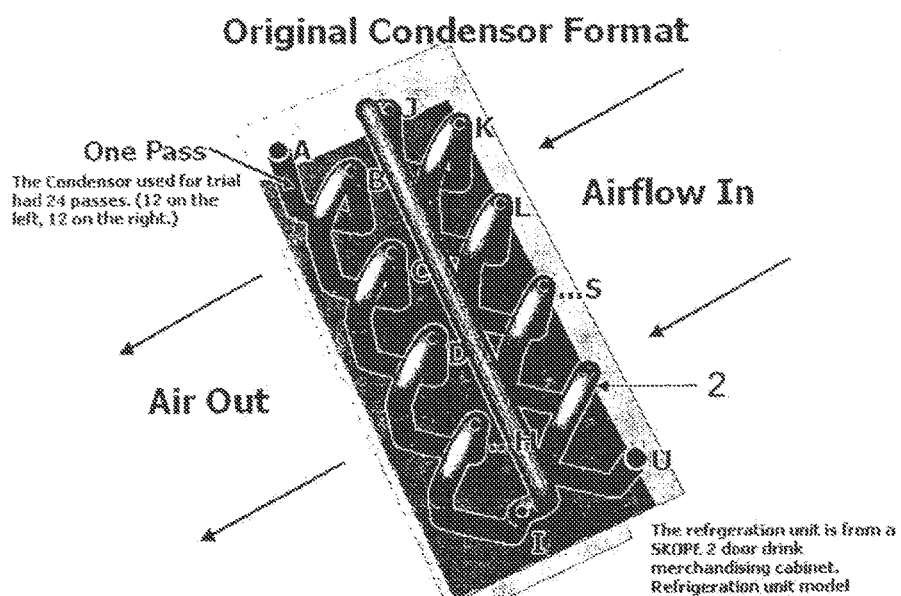
FIGS. 6 and 7 show heat exchanger configurations pre and post insertion of flow direction control insert in a SKOPE 2 door drink merchandising cabinet refrigeration unit model No SK650-C a for test, in accordance with an embodiment of the present invention.

At step 506, the ends of the tubes then have elbows soldered to one another to form a continuous serpentine arrangement. This is best illustrated in FIG. 6. A fan (not shown) may be added to force air over the fins.

Experimental Results

Figure 7:
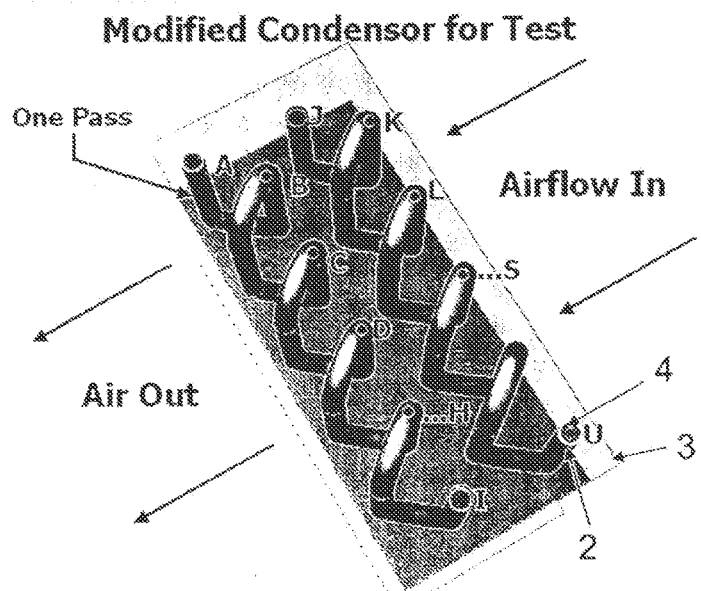

A two door drink fridge condensing unit was used for the trial. For expedience, the condenser tubing was split in two sections as can be seen from the FIG. 7 schematic. Passes A to I (only some passes are shown in the schematic for illustrative purposes) were modified to accept the helical screw and used as the complete condensing unit, while passes J to U were kept standard (i.e. no flow direction control insert). Due to the halving of the capacity of the condenser, the trial was conducted in a low ambient temperature atmosphere. The results were then compared with the results using the passes J to U again in a low ambient temperature atmosphere. Whilst modifying the left hand part of the condenser some of the passes were damaged and could not be used. Two temperature reading tubes were soldered 50 mm into the gas flow, the end of which was sealed, in the positions marked on tubes A and U of FIGS. 6 & 7. A temperature probe was then inserted into these tubes for accurate temperature measurements. The test results are shown in FIG. 8. It can be observed from the test results that by using a helical screw with fewer passes, a significant positive improvement in relation to efficiency of the heat exchanger is achieved. A further test was carried out in respect of an air conditioning system for a vehicle. A conventional condenser unit from a Holden Astina (hereafter "the Astina condenser") was set up on a test bench alongside a condenser incorporating a plurality of tubes including helical flow direction control inserts (hereafter "the helical screw condenser"), in accordance with an embodiment of the invention.

Figure 9:
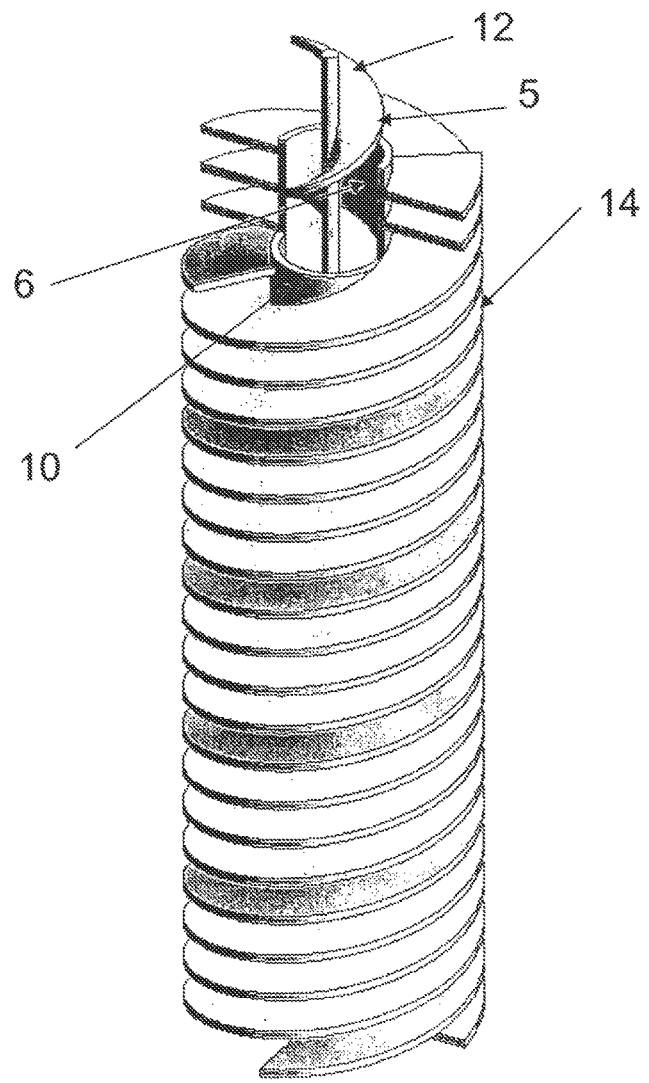
FIG. 9 is a schematic of a tube carrying a helical flow direction control insert in accordance with a further embodiment of the present invention.

The Astina condenser had a block size of 580 mm long×300 high (i.e. effective fin area) and included a total of 28 tubes having 8 micro-channels defined therein. The micro-channels measured 1.7 mm wide×1.5 mm high. The helical screw condenser on the other hand measured only 490 mm long×310 mm high. 10 tubes formed of ¾" copper pipe were included in the screw condenser body. Each of the tubes incorporated helical screws of 17.6 mm O/D (outside diameter) 14.9 pitch (i.e. which in this case is the distance in millimeters between the leading edge of each turn of the helical thread), 1 mm blade thickness and centre stem diameter of 2.5 mm. A schematic of the tubing configuration of the helical screw condenser is shown in FIG. 9, where the screw body is designated by the reference numeral 10, the thread is designated by the reference numeral 12 and the fins are designated by reference numeral 14.

It was demonstrated that the volume of gas through the helical screw condenser body 10 was measured as twice that of the volume through the Astina condenser. From the demonstration it was calculated that a pass of 13.9 mm in the micro channel condenser equated to approximately 57 mm in the new condenser, which increases the effective path length of the helical screw condenser by a factor of 4. Thus, for the same physical size of heat exchanger, the length of the new condenser would be 4 times longer at twice the volume (thereby, by calculation, making the new condenser 8 times bigger in capacity for the same physical size).

The above embodiments described the helical insert as being removably coupled to the tubing. However, in an alternative embodiment, the helical insert and outer tubing may be formed as one piece (i.e. integrally formed). For example, the heat exchanger may be formed by extruding a length of heat transmissive material, such as aluminium, through a die so as to form a tube having an inner surface in which the flow direction control insert is formed. Alternatively, or in addition, the outer fin(s) may be extruded with the tubing to minimise construction costs.

A second embodiment of an exchanger will now be described with reference to FIGS. 10 through 17. According to the second embodiment, improved heat transfer characteristics may be achieved without the aid of a spiral insert, as previously described. Instead, and is evident from the figures, the heat exchanger tubes may each comprise a primary flow path 15 arranged to carry the flow of the first heat exchanging medium and which surrounds a secondary flow path 16 which carries a second heat exchanging medium. Such a configuration advantageously allows heat from the first heat exchanging medium to not only be exchanged with air (or another suitable medium) passing over the outer wall 18 of the primary flow path 15, but in addition to exchange heat with a medium flowing through the enveloped secondary flow path 16. To further assist with the heat transfer at least one of the primary and secondary flow paths may be helical for increasing their effective path length. Another advantage arising from the aforementioned tubular construction is that condensation is unable to pool on the primary flow path surface.

Figure 10:
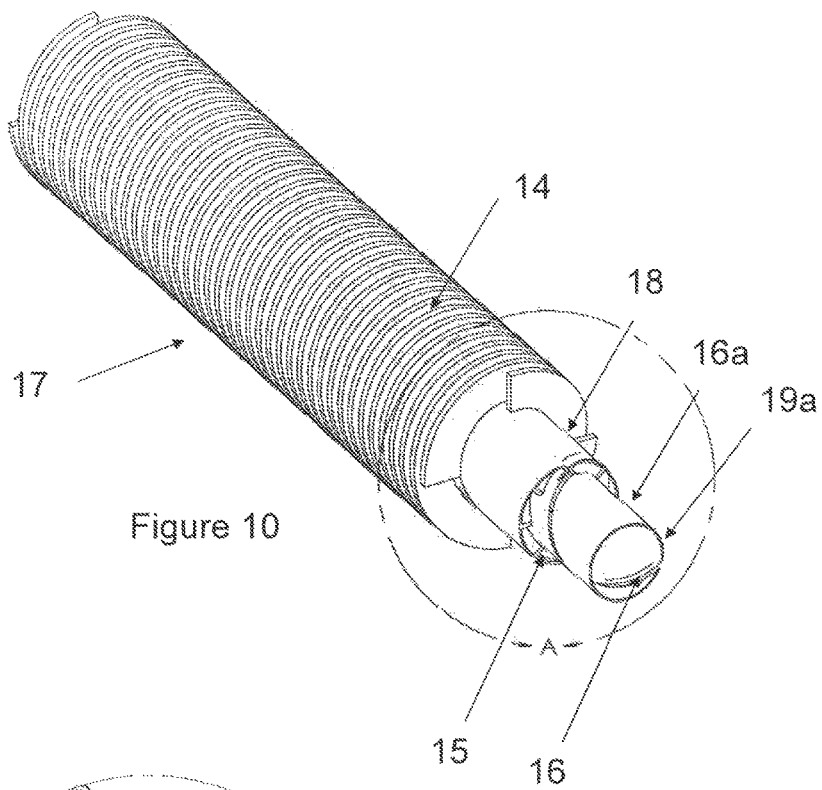
FIG. 10 is a schematic of an exchanger tube in accordance with yet a further embodiment of the present invention.
Figure 11:
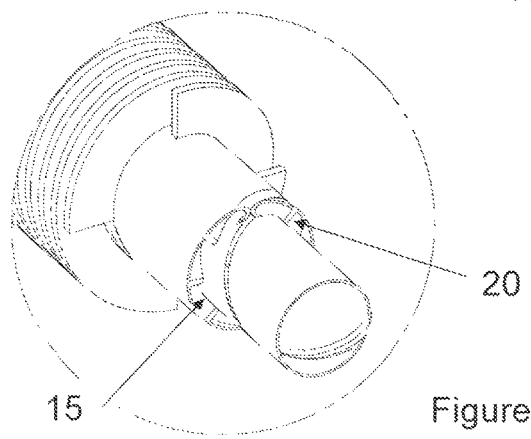
FIG. 11 is a detailed view of section A identified in FIG. 10.
Figure 16:
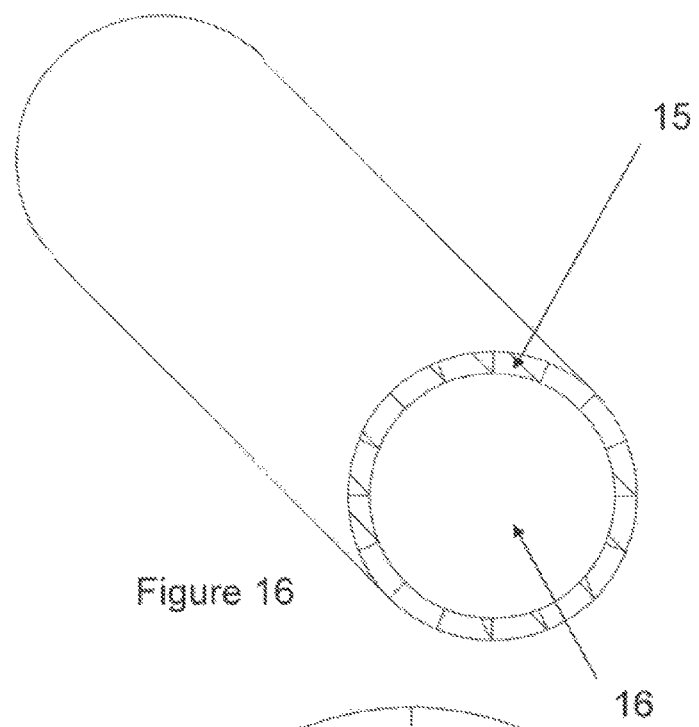
FIGS. 16 and 17 are isometric and end views respectively of an exchanger tube in accordance with another embodiment of the present invention.
Figure 17:
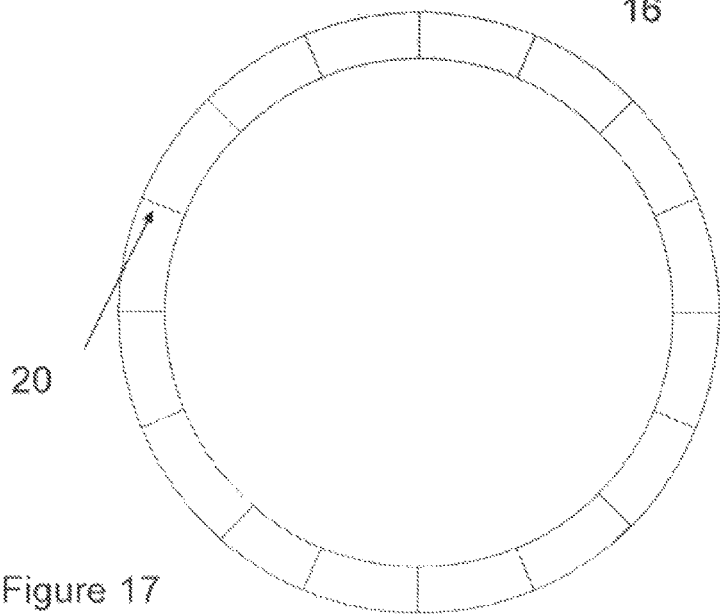

In more detail, and with particular reference to FIGS. 10 and 11, a single heat exchanger tube 17 formed of a suitable heat transmissive material (e.g. copper, aluminium, etc.) comprises an outer circumferential wall 18 which is surrounded by one or more heat exchanging fins 14 in the same manner as previously described with reference to FIG. 9. According to the illustrated embodiment, the secondary heat exchanging medium is carried within a separate inner tube 16*a* located within the tube body, while the first medium is carried within a flow path defined in the outer wall 18. The primary flow path 15 is partitioned by way of internal webs 20 so as to create a plurality of separate helical flow paths which extend along the length of the tube 17. This may serve to increase the heat transfer capabilities, as well as increase the structural strength of the exchanger tube. It will be understood, however, that the primary flow path(s) need not necessarily be helical and could instead, for example, deviate in a serpentine or other suitable non-linear path. Alternatively, the path(s) may be straight and non-deviating along the length of the tube as is shown in FIGS. 16 and 17.

Figure 18:
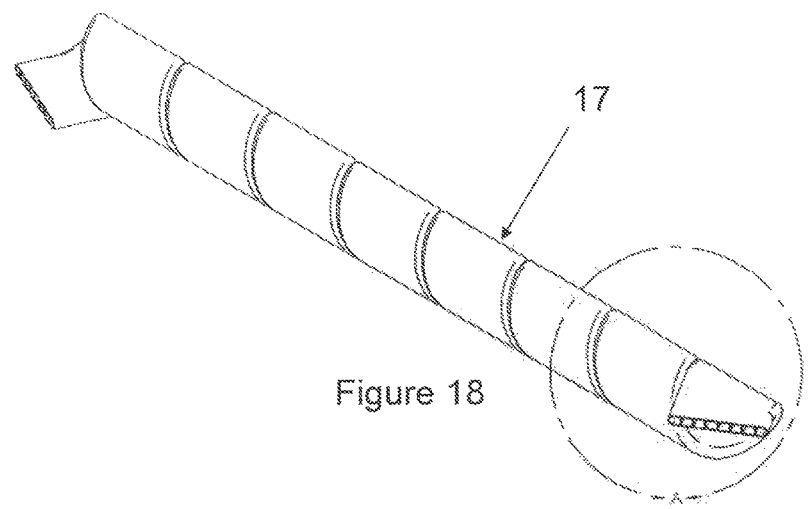
FIG. 18 is a schematic of an exchanger tube in accordance with another embodiment of the present invention.
Figure 19:
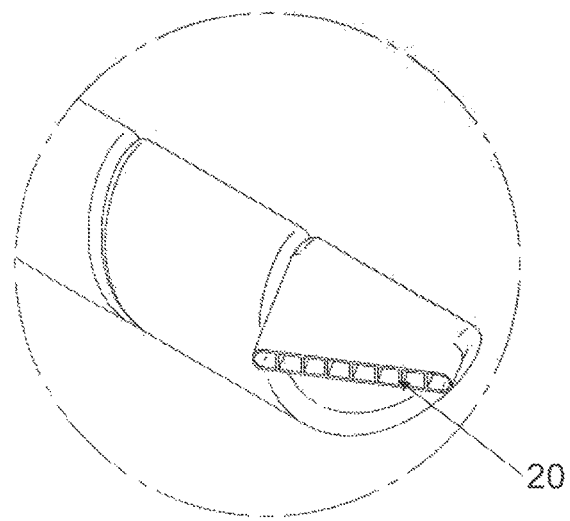
FIG. 19 is a detailed view of section A identified in FIG. 18.
Figure 20A:
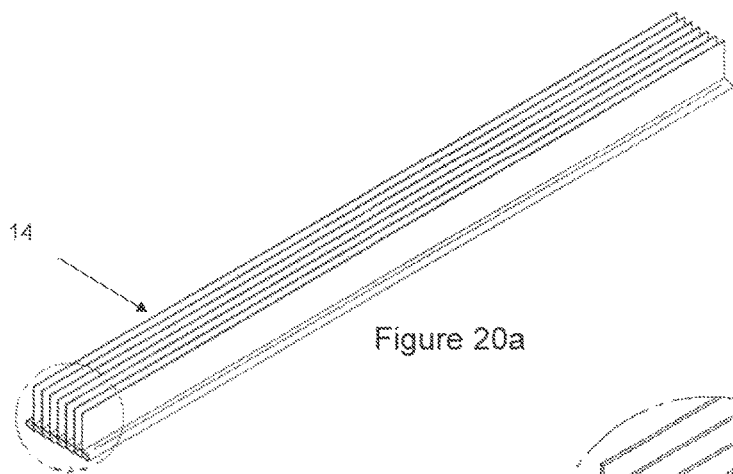
FIGS. 20a, 20b and 20c are various schematic views of an extruded length of micro-channel incorporating fins for forming a heat exchanger tube, in accordance with an embodiment
Figure 20B:
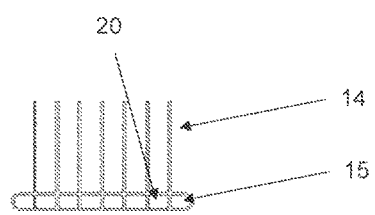
Figure 20C:
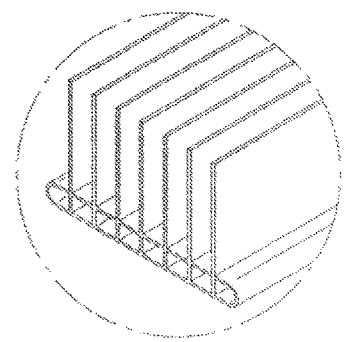
Figure 21A:
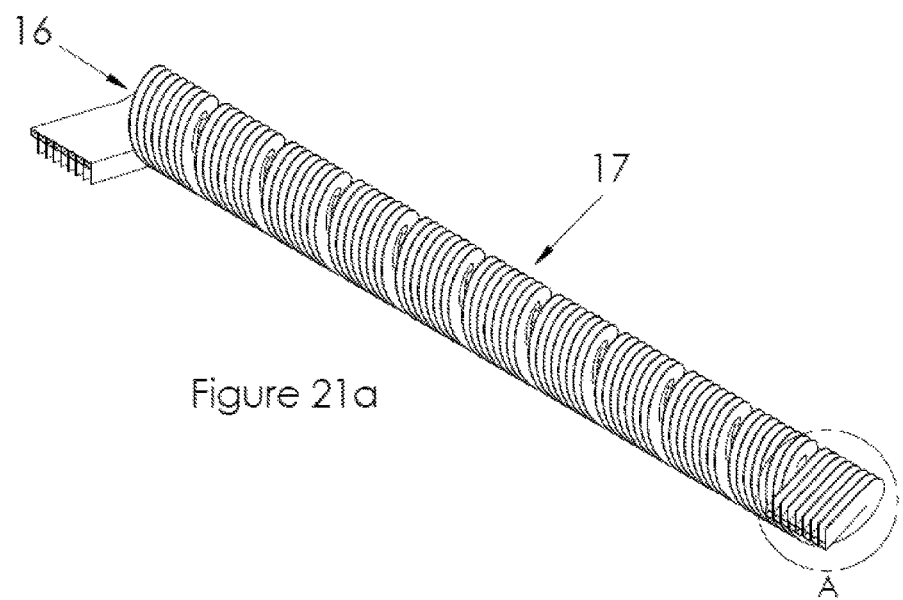
FIGS. 21a and 21b are schematic views where
Figure 21B:
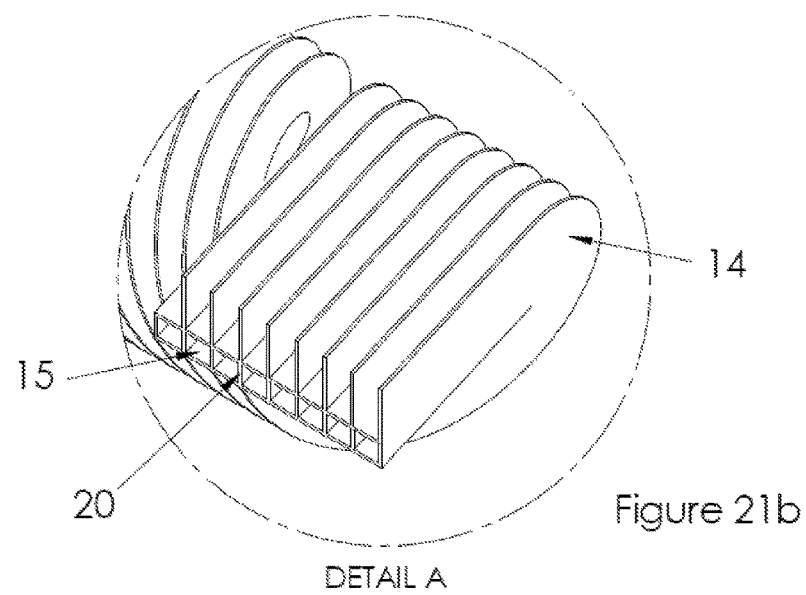

The exchanger tube 17 (including its partitioned circumferential wall 18) may be formed by an extrusion process (i.e. in a linear fashion). As an alternative technique, and with specific reference to the embodiment shown in FIGS. 18 and 19, the tube 17 may be formed by coiling/winding a straight length of tubing 19 of generally elongate cross section, such that the length extends along a helical path. Such a technique may advantageously allow manufacturers to utilise readily available straight flow tube lengths which are found in conventional heat exchanger designs (e.g. such as micro-channel tube lengths used in micro-channel heat exchangers) for forming the primary flow paths. Internal webs 20 formed within and extending along the length 19 may advantageously serve to direct the flow in a helical path along the tube (once coiled), for increasing the heat transfer characteristics. As shown in the illustrated embodiment, the tube length 19 is coiled or otherwise formed to create a closed outer circumferential wall which defines a sealed inner flow path for carrying the secondary flow (i.e. such that a separate inner tube is obviated). In other words, the tube is tightly wound such that the lower face creates a closed internal space or a hollow space from the one end of the tube to the other end. FIG. 20 shows an alternative micro-channel design which could be formed into an exchanger tube as afore-described, whereby the fins 14 are integrally extruded with the channel. The outer lower side of the tube has no fins 14. A side face of the tube has a planar surface or round surface. Also, the side face of the tube has no fins. FIGS. 21*a* and 21*b* show a length of micro-channel tube (17) comprising a plurality of flow channels (15) defined therein and which are each operable to carry a first heat exchanging medium, the extrusion process further resulting in a plurality of outwardly extending projections (14) being formed on an outer upper face of the micro-channel tube and which projections extend substantially the length thereof and wherein the extrusion process also results in outer lower and side faces of the micro-channel having a substantially planar profile; and helically winding the length of micro-channel tube such that, in use, the one or more projections on the upper face are operable as fins for allowing a second heat exchanging medium passing there over to exchange heat with the first heat exchanging medium passing through the plurality of helically wound flow channels.

Figure 12:
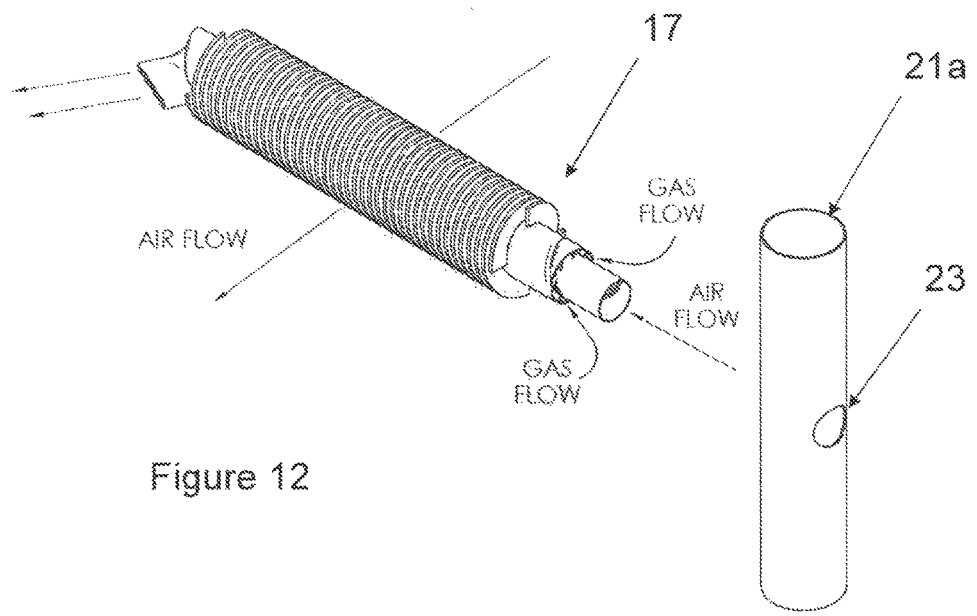
FIG. 12 is an exploded isometric view of a single exchanger tube and manifold, in accordance with an embodiment.
Figure 13:
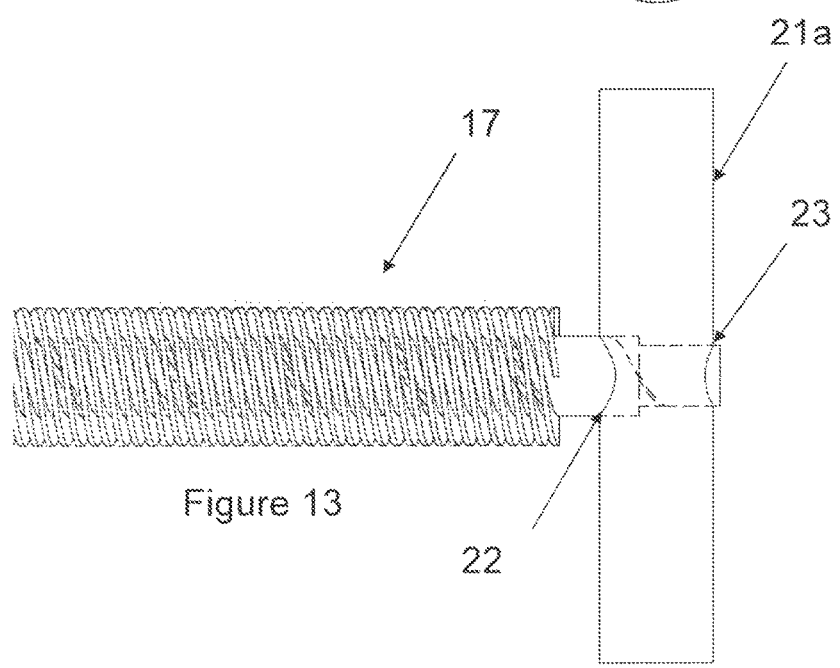
FIG. 13 is a partially assembled front view of the exchanger tube and manifold of FIG. 12.
Figure 14:
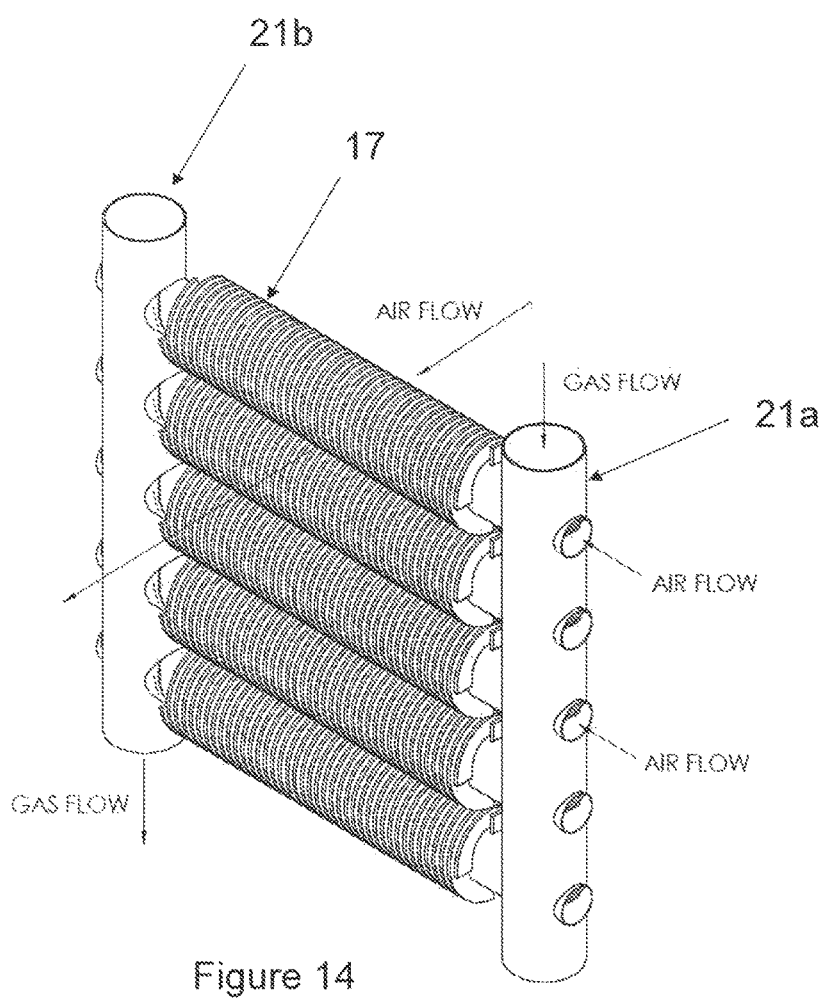
FIG. 14 is an assembled isometric view of an exchanger including an inlet and outlet manifold connected to five exchanger tubes, in accordance with an embodiment.
Figure 15:
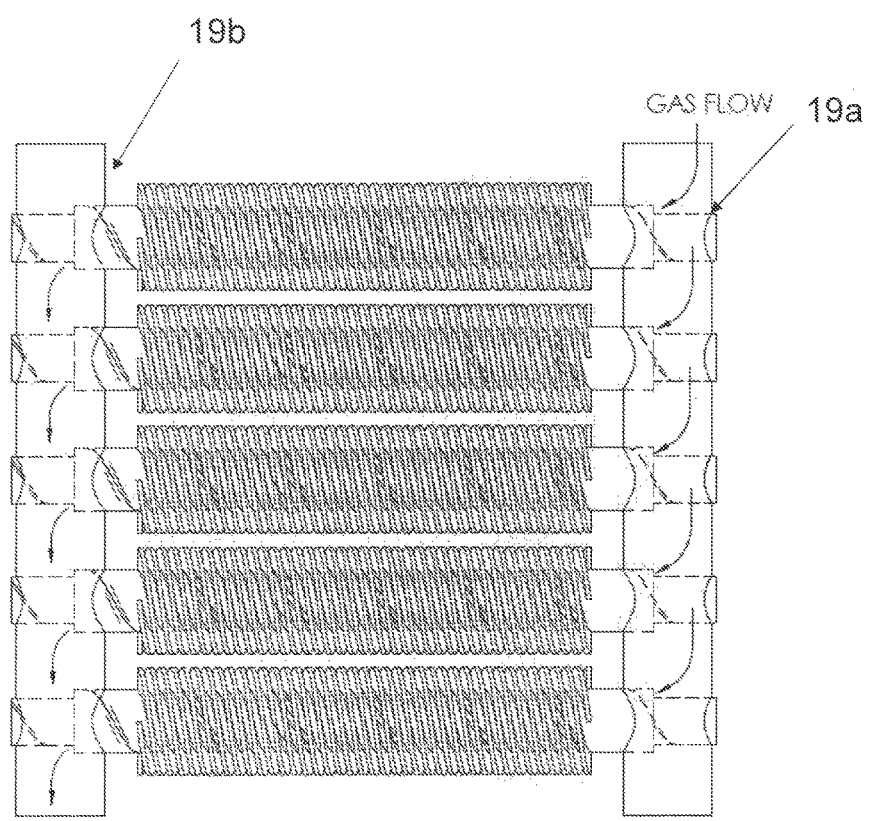
FIG. 15 is a front view of FIG. 14 with a section of the inlet/outlet manifolds shown in hidden detail, illustrating fluid flow directions within the exchanger.

The exchanger tubes 17 are connected to an inlet and outlet manifold for receiving/expelling the respective heat exchanging mediums. FIG. 12 shows an exploded view of the exchanger tube of FIG. 11, with an inlet manifold 21*a* in the form of a copper pipe. As shown, at a first end 19*a* of the tube 17 the outer wall 18 is paired away, exposing a length of the inner tube 16*a* which carries the secondary medium. The first end 19*a* is then inserted into an aperture 22 defined in a wall of the inlet manifold 21 such that the primary flow path is in fluid communication with the inlet manifold for delivering the first heat exchanging medium (in this case refrigerant gas). A portion of the inner tube 16*a* extends through a slightly smaller opposing aperture 23 in the inlet manifold wall, for receiving the secondary medium (in this case air, which may either be ambient air or alternatively air forced through the secondary flow path using a fan or the like). A second end 19*b* of the tube 17 is coupled to an outlet manifold 21*b* (which may, for example, be under vacuum) having the same form as the inlet manifold 21*a* in an identical manner. An assembled view of a heat exchanger according to an embodiment is shown in FIG. 14. FIG. 16 shows a sectional view of the manifold coupling through line A-A of FIG. 15.

It will be understood that in one embodiment the number of flow paths defined in each tube of the exchanger may vary. For example, for an automotive exchanger where the tubes are connected in series, the number of flow paths may reduce for each pass so as to account for changes in the state of the primary heat exchanging medium (e.g. liquid to gas or vice versa). Furthermore, it will be understood that the heat exchanging medium passing through the primary and secondary flow paths may be any suitable medium and should not be seen as being restricted to those described above. For example, rather than the secondary flow path carrying air it could instead carry water such that the primary heat exchanging medium is exchanging heat with two different mediums (i.e. air through the fins and water through the secondary flow path).

It is to be understood that, if any prior art publication is referred to herein, such reference does not constitute an admission that the publication forms a part of the common general knowledge in the art, in Australia or any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Aspects of the present invention have been described by way of example only and it should be appreciated that modifications and additions may be made thereto without departing from the scope thereof as defined in the appended claims.

The invention claimed is:

1. A method of forming a heat exchanger tube, comprising:
   by way of an extrusion process, forming a length of micro-channel tube comprising a plurality of flow channels defined therein and which are each operable to carry a first heat exchanging medium, the extrusion process further resulting in a plurality of outwardly extending projections being formed on an outer upper face of the micro-channel tube and wherein the extrusion process also results in an outer lower face of the micro-channel tube having a planar surface devoid of the plurality of outwardly extending projections; and helically winding the length of micro-channel tube such that, in use, at least one or more of the plurality of the helically wound outwardly extending projections formed on the upper face are operable as fins for allowing a second heat exchanging medium passing there over to exchange heat with the first heat exchanging medium passing through the plurality of helically wound flow channels.

2. The method in accordance with claim 1, wherein a side face of the micro-channel tube has a planar surface or round surface.

3. The method in accordance with claim 2, wherein the side face of the micro-channel tube is devoid of the plurality of outwardly extending projections.

4. The method in accordance with claim 1, wherein the micro-channel tube is tightly wound such that the lower face thereof defines a closed internal space for providing a third heat exchanging medium which is operable to exchange heat with the first heat exchanging medium.

5. The method in accordance with claim 1, further comprising coupling a first end of the micro-channel tube to an opening in an inlet manifold arranged and a second end of the micro-channel tube to an outlet manifold for delivery and expulsion, respectively, of the first heat exchanging medium.

* * * * *